US005739497A

United States Patent [19]
Tanaka

[11] Patent Number: 5,739,497
[45] Date of Patent: Apr. 14, 1998

[54] METHOD OF AND APPARATUS FOR INCREASING THE PRODUCTIVITY OF AN ELECTROEROSION DRILL

[76] Inventor: Dwight Tanaka, 20290 Pacifica Dr., Cupertino, Calif. 94014

[21] Appl. No.: 439,353

[22] Filed: May 11, 1995

Related U.S. Application Data

[63] Continuation of Ser. No. 194,846, Feb. 14, 1994, Pat. No. 5,416,289.

[51] Int. Cl.$^6$ .................. B23H 1/10; B23H 9/14
[52] U.S. Cl. .................. 219/69.14; 219/69.17; 219/69.2
[58] Field of Search .................. 219/69.14, 69.17, 219/69.11, 69.15; 204/224 M; 205/665

[56] References Cited

U.S. PATENT DOCUMENTS

| | | | |
|---|---|---|---|
| 3,468,784 | 9/1969 | Joyce et al. | 204/224 M |
| 3,847,781 | 11/1974 | Bellows | 204/224 M |
| 4,393,292 | 7/1983 | Inoue | 219/67.17 |
| 4,538,048 | 8/1985 | Alexander | 219/69.2 |
| 4,705,932 | 11/1987 | Aso et al. | 219/69.2 |
| 4,990,737 | 2/1991 | Obara | 219/69.11 |
| 5,004,530 | 4/1991 | Tanaka | 204/224 M |
| 5,019,683 | 5/1991 | Abdukarimov et al. | 219/69.2 |
| 5,128,505 | 7/1992 | Matter | 219/69.12 |
| 5,245,152 | 9/1993 | McCall | 219/69.14 |
| 5,281,788 | 1/1994 | Abiko et al. | 219/69.14 |

FOREIGN PATENT DOCUMENTS

| | | | |
|---|---|---|---|
| 58-114824 | 7/1983 | Japan | 219/69.15 |
| 2247204 | 2/1992 | United Kingdom . | |

*Primary Examiner*—Geoffrey S. Evans
*Attorney, Agent, or Firm*—Donald E. Schreiber

[57] ABSTRACT

The technical field of the invention generally concerns electroerosively drilling small diameter holes, e.g. holes 6.0 mm in diameter and smaller. Such a small hole drilling apparatus includes a worktable for receiving a workpiece, together with a chuck and an electrode guide which receives and retains an elongated and thin tubular electrode. The drilling apparatus also includes a fluid supply and pump which delivers a first flow of machining fluid to an inner bore of the tubular electrode at a pressure of at least 20 kg/cm$^2$. The drilling apparatus also includes a power supply for applying a series of electrical machining pulses between the tubular electrode and the workpiece. As material is removed from the workpiece, an electrode feed mechanism included in the drilling apparatus advances the tubular electrode into the workpiece to maintain the spacing between the tubular electrode and the workpiece. The improved drilling apparatus includes a secondary machining fluid control and a flushing nozzle which directs a second flow of the machining fluid along the outer surface of the tubular electrode toward the machining gap. As the tubular electrode pierces through the workpiece, the second flow of machining fluid keeps the space between the electrode's outer surface and the workpiece including the machining gap filled with machining fluid.

18 Claims, 2 Drawing Sheets

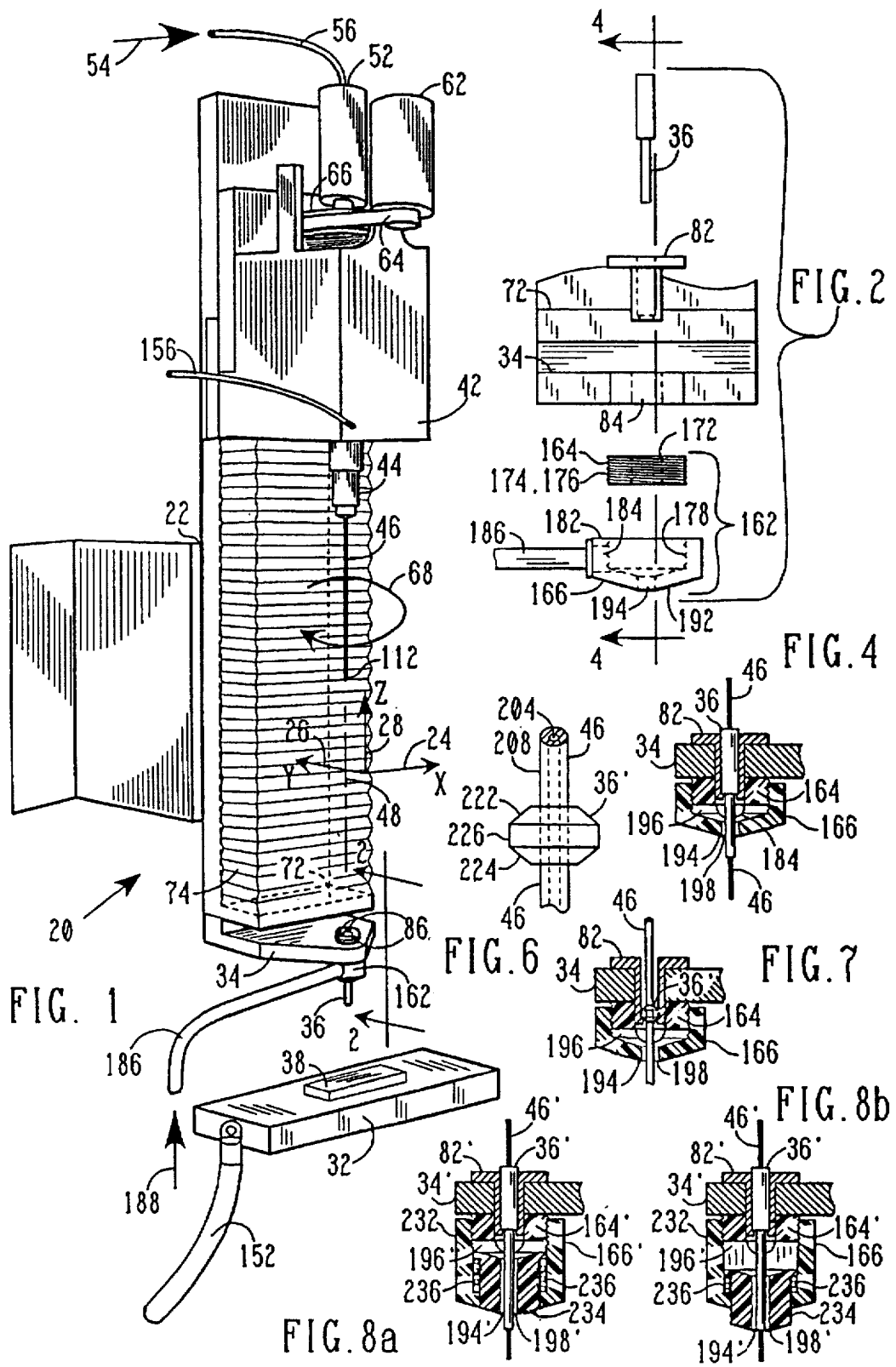

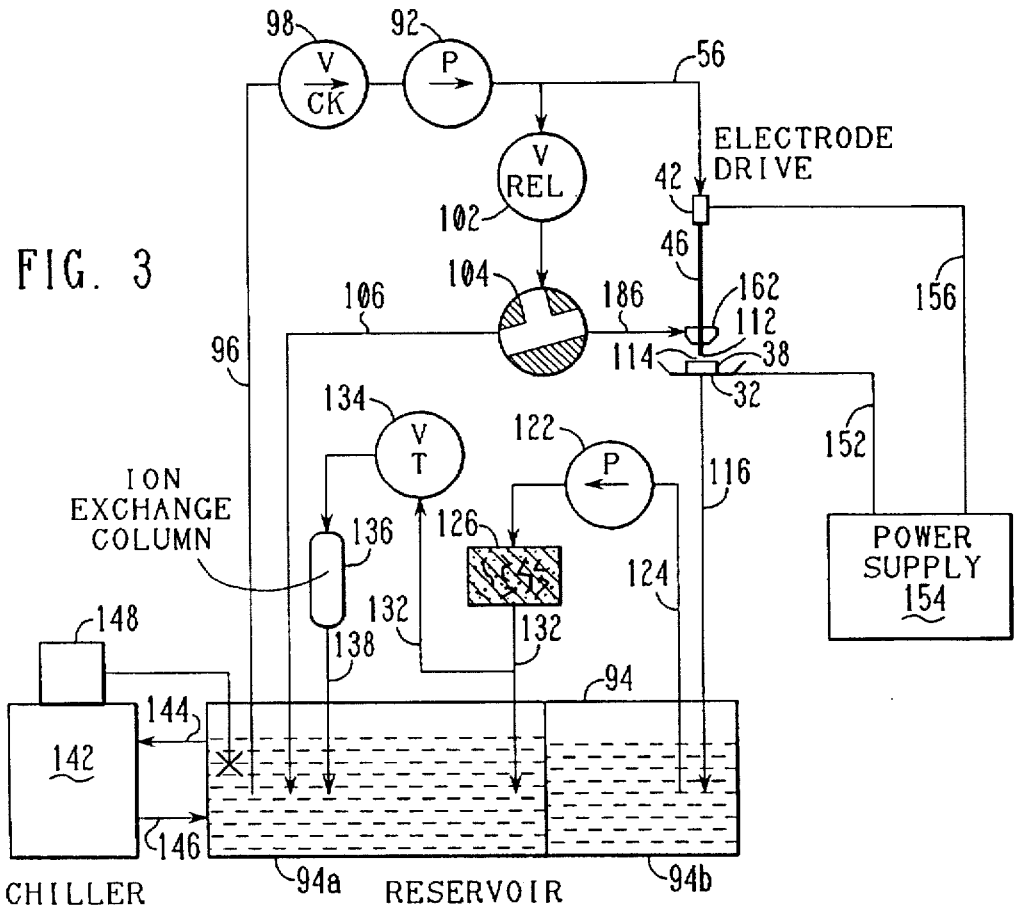
FIG. 3
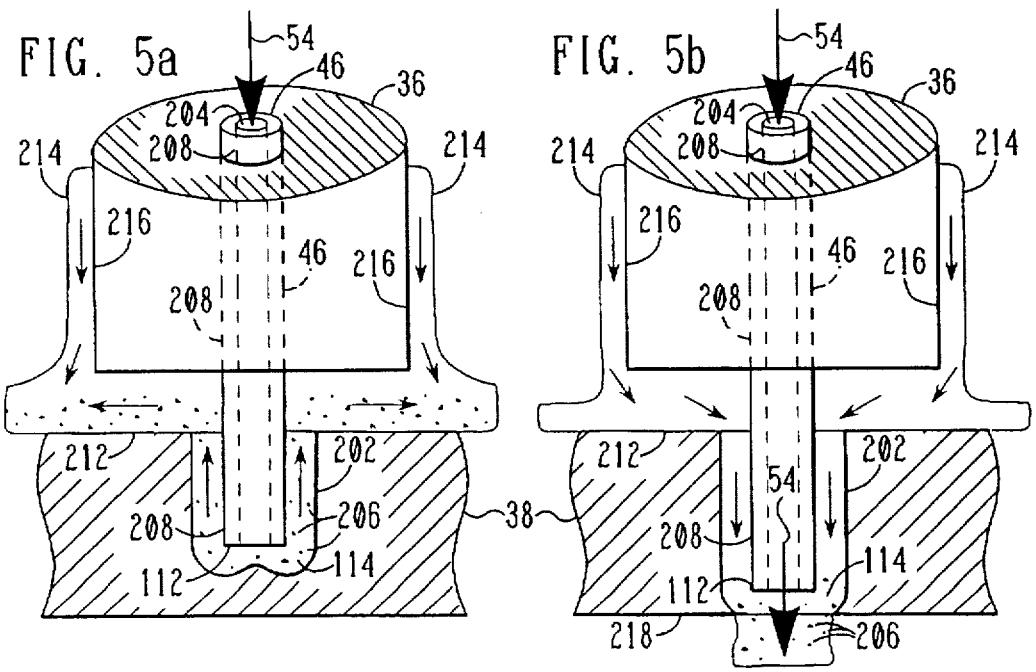
FIG. 5a
FIG. 5b

METHOD OF AND APPARATUS FOR INCREASING THE PRODUCTIVITY OF AN ELECTROEROSION DRILL

CROSS-REFERENCE TO RELATED APPLICATION

This application is a continuation of copending application Ser. No. 08/194,846, filed Feb. 14, 1994, now issued as U.S. Pat. No. 5,416,289.

BACKGROUND OF THE INVENTION

1. Field of the Invention

The present invention relates generally to electroerosion machining, and more particularly, to quickly forming small diameter holes completely through a conductive workpiece using electro-erosion.

2. Description of the Prior Art

U.S. Pat. No. 4,393,292, entitled "Method Of And Apparatus For Electrical Discharge Machining A Small And Deep Hole Into Or Through A Workpiece" that issued Jul. 12, 1983, on a patent application filed in the name of Kiyoshi Inoue ("the Inoue '292 Patent"), discloses that electroerosion (a/k/a electrical discharge machining or EDM) is capable of drilling holes having a diameter of 1.0 mm or less, i.e. 0.040 inches or less, and a depth-to-diameter ratio of at least 5 into or through an electrically conductive workpiece using a tubularly shaped electrode at speeds of 20 to 30 mm/min, i.e. a speed of approximately 1 inch per minute. To achieve such rapid machining, the Inoue '292 Patent discloses supplying a deionized water machining fluid into an electroerosion machining gap between the tubular electrode and the workpiece. The Inoue Patent further discloses that this water machining fluid preferably has a specific resistivity in excess of $10^4$ ohm-cm, and must be supplied to the electrode at a pressure of at least 20 kg/cm$^2$; preferably at 25 kg/cm$^2$; and more desirably at 40 kg/cm$^2$. The applicant hereby incorporates by reference the Inoue '292 Patent.

Since the filing of the application which issued as the Inoue '292 Patent, further refinements have been developed in the electroerosion technique which it discloses. For example, in an effort to increase machining speed for larger diameter tubular electrodes at a high power setting, 10% to 50% of various different water soluble glycol-based materials have been added to deionized water to increase the machining fluid's boiling point and dielectric effect. Alternatively, in an effort to reduce wear of the tubular electrode during machining, 5% to 10% of graphite has been added to the deionized water machining fluid. Moreover, recent advances in small hole drilling electroerosion equipment now permit forming holes into or through a conductive workpiece with a depth-to-diameter ratio of up to 500:1. For example, using a 1.0 mm diameter tubular electrode is now possible to drill a hole through a one-half meter thick workpiece, i.e. drilling a 0.040 inch diameter hole through a 20.00 inch thick workpiece. Furthermore, it has also been found possible to form holes using tubular electrodes with a diameter down to 0.1 mm and up to 6.5 mm while maintaining a high machining speed.

Despite the remarkable machining performance achieved by the electroerosion technique disclosed in the Inoue '292 Patent, drilling such holes becomes unstable as the tubular electrode pierces through the workpiece. Thus, as a tubular electrode begins to pierce through the workpiece, machining speed slows drastically, and in some instances the electrode may even weld to the workpiece. Frequently, the time required to finally form an exit hole completely through the workpiece may equal or even exceed the time required to drill through the workpiece prior to forming the exit hole. For example, drilling a hole through a 1.0 inch thick D2 steel workpiece using a 3.0 mm diameter electrode requires approximately 60 seconds until the tubular electrode initially begins forming an opening through the workpiece. However, completing the exit hole through the workpiece may also require as long as 60 seconds. Consequently, drilling holes through workpieces using the electroerosion technique disclosed in the Inoue '292 Patent could be facilitated and the overall productivity achieved in electroerosively drilling small and deep holes could effectively be doubled if it were possible to stabilize machining and maintain the technique's high machining speed while finally piercing through a workpiece.

SUMMARY OF THE INVENTION

An object of the present invention is to maintain electroerosion machining speed while forming an exit hole through a workpiece with a tubular electrode.

Yet another object of the present invention is to increase productivity in electroerosively drilling small, deep holes.

Briefly the present invention includes an improved method of and drilling apparatus for electroerosively machining small and deep holes through workpieces. The drilling apparatus includes a mechanical assembly which comprises a worktable for receiving a workpiece, together with a chuck and an electrode guide which receives and retains an elongated and thin tubular electrode. The tubular electrode has a hollow inner bore and an outer surface. Both the inner bore and outer surface of the tubular electrode are coaxial with the electrodes longitudinal axis. In drilling a small and deep hole through a workpiece, a first end of this tubular electrode is juxtaposed with the workpiece to establish an electroerosion machining gap between a first end of the tubular electrode and the workpiece.

The drilling apparatus also includes a fluid supply and pump which delivers a first flow of machining fluid to the inner bore of the tubular electrode at a pressure of at least 20 kg/cm$^2$. This first flow of the machining fluid passes through the inner bore of the tubular electrode into the machining gap established between the first end of the tubular electrode and the workpiece.

The drilling apparatus also includes a power supply for applying a series of electrical machining pulses between the tubular electrode and the workpiece. With the first end of the tubular electrode juxtaposed with the workpiece to establish the machining gap, this series of electrical machining pulses causes time-spaced electrical discharges across the gap. If the gap between the first end of the tubular electrode and the workpiece is filled with the machining fluid, these time-spaced electrical discharges electroerosively remove material from the workpiece at a high machining speed.

As material is removed from the workpiece, an electrode feed mechanism included in the drilling apparatus advances the tubular electrode along its longitudinal axis toward the workpiece to maintain the spacing between the tubular electrode and the workpiece. In the preferred embodiment of this drilling apparatus, this electrode feed mechanism also rotates the tubular electrode as the electrode feed mechanism advances the first end of the tubular electrode into the workpiece.

The improved drilling apparatus includes a secondary machining fluid control and a flushing nozzle which is preferably a coaxial flushing nozzle that surrounds a segment of the tubular electrode. A flushing nozzle in accordance with the present invention is arranged about the tubular electrode for directing a second flow of the machining fluid along the outer surface of the tubular electrode toward the machining gap. As the first end of the tubular electrode advances into the workpiece before piercing through the workpiece, the first flow of machining fluid initially passes through the electrode's inner bore to flood the machining gap, and then flows out of the machining gap through a cylindrically shaped space formed between the electrode's outer surface and the workpiece. However, as the electrode pierces through the workpiece, this first flow of machining fluid begins escaping out of the hole through the opening now forming through the workpiece. Machining fluid escaping out of the hole deprives the machining gap of a flow of machining fluid.

Without the second flow of the machining fluid supplied along the outer surface of the tubular electrode by the improved drilling apparatus, the absence of a flow of the machining fluid through the machining gap upon forming an opening through the workpiece drastically reduces machining speed. However, in the improved drilling apparatus the second flow of machining fluid keeps the space between the electrode's outer surface and the workpiece including the machining gap filled with machining fluid. Moreover, the first flow of machining fluid through the inner bore of the electrode and out of the opening formed through the workpiece entrains the machining fluid supplied to the machining gap by the second flow of machining fluid thus drawing machining fluid into the machining gap from the space between the workpiece and the electrode's outer surface. In this way, the improved drilling apparatus maintains the machining gap full of machining fluid as the tubular electrode pierces the workpiece and retains the high electroerosive machining speed disclosed in the Inoue '292 Patent. Thus, using this improved method of and drilling apparatus for electroerosively machining a small and deep hole the machining speed is not drastically reduced as the tubular electrode pierces through the workpiece.

An advantage of the present invention is that holes formed through a workpiece by electrosion have a more uniform diameter along their length.

Another advantage of the present invention is an increased uniformity among diameters for a plurality of holes drilled through a workpiece one after another using the same tubular electrode.

Another advantage of the present invention is that it forestalls electrode damage resulting from short circuits between the electrode and the workpiece.

Another advantage of the present invention is that it impedes contamination of the electrode guide by swarf.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective drawing depicting a portion of the mechanical assembly of a small hole drilling apparatus which incorporates a coaxial flushing nozzle assembly in accordance with the present invention;

FIG. 2 is an exploded elevational view of a portion of the drilling apparatus taken along the line 2—2 of FIG. 1 which illustrates an electrode guide and a coaxial flushing nozzle assembly in accordance with the present invention;

FIG. 3 is a functional block diagram which depicts a fluid supply and pump, and a power supply that are included in the small hole drilling apparatus depicted in FIG. 1;

FIG. 4 is a cross-sectional elevational view taken along the line 4—4 of FIG. 2 depicting the interior of an assembled coaxial flushing nozzle assembly in accordance with the present invention;

FIG. 5a is a cross-sectional elevational view illustrating the operation of the drilling apparatus depicted in FIG. 1 while drilling a hole into a workpiece;

FIG. 5b is a cross-sectional elevational view, similar to the illustration of FIG. 5a, that illustrates the operation of the drilling apparatus depicted in FIG. 1 while drilling a hole through a workpiece;

FIG. 6 is an elevational view depicting an alternative embodiment electrode guide;

FIG. 7 is a cross-sectional elevational view, similar to that of FIG. 4, but which depicts the relationship between the alternative embodiment electrode guide and the flushing nozzle assembly of FIG. 4;

FIG. 8a is a cross-sectional elevational view, similar to the view of FIG. 4, which depicts an alternative embodiment flushing nozzle which incorporates a moveable inner plunger that retracts into the flushing nozzle assembly when no second flow of machining fluid is supplied to the flushing nozzle assembly; and FIG. 8b is a cross-sectional elevational view of the alternative embodiment flushing nozzle assembly of FIG. 8a with the flushing nozzle's inner plunger extended outward in response to the application of a second flow of machining fluid to the flushing nozzle assembly.

DETAILED DESCRIPTION OF THE PREFERRED EMBODIMENT.

Referring now to FIG. 1, depicted there is a portion of a deep hole drilling apparatus referred to by the general reference character 20. The portion of the drilling apparatus 20 depicted in FIG. 1 includes a compound slide assembly 22 which is supported upon a moving bridge (not illustrated in any of the figures). The compound slide assembly 22 may move laterally along the moving bridge both parallel to an X-axis 24 and parallel to a Y-axis 26 respectively indicated by arrows in FIG. 1. The compound slide assembly 22 itself may move upward and downward with respect to the moving bridge parallel to a Z-axis 28. Lowering the compound slide assembly 22 downward toward a worktable 32, located beneath a projecting foot 34 of the compound slide assembly 22, permits a lower end of a cylindrically-shaped bullet electrode guide 36 to be juxtaposed with a workpiece 38 resting on the worktable 32.

The compound slide assembly 22 carries an electrode feed mechanism 42 which may move up and down along the compound slide assembly 22 parallel to the Z-axis 28 independent of any movement by the compound slide assembly 22. The electrode feed mechanism 42 includes a hollow rotary spindle (not visible in any of the figures) to the lower end of which is secured an electrode chuck 44. To drill holes into the workpiece 38, a tubular electrode 46, having a longitudinal axis 48 disposed parallel to the Z-axis 28, depends from and is secured in the electrode chuck 44. A rotary union 52, secured to the upper end of the rotary spindle, receives a first flow of water-based machining fluid, indicated by an arrow 54, through a first hose 56. (As used herein, the phrase "water-based machining fluid" refers both to water used as an electroerosion machining fluid without any additive, and also to a mixture of water with other materials used as an electroerosion machining fluid.) The electrode feed mechanism 42 also includes an electric motor 62, which is coupled by a belt 64 and a pulley 66 to the rotary shaft, for rotating the electrode chuck 44 together with the tubular electrode 46 about the longitudinal axis 48 of the tubular electrode 46 as indicated by the circular arrow 68.

At the lower end of the compound slide assembly 22, immediately above the foot 34, a bellows mounting bracket 72 projects outward parallel to the foot 34. To protect precision ways included in the compound slide assembly 22 from any spray of the machining fluid, the compound slide assembly 22 includes a pleated bellows 74 which extends along the length of the compound slide assembly 22 from the bottom of the electrode feed mechanism 42 down to the bellows mounting bracket 72.

Referring now to FIG. 2, a hollow, cylindrically-shaped electrode guide holder 82 passes through an aperture 84 formed through the foot 34 of the compound slide assembly 22. The electrode guide holder 82 is secured to the foot 34 by screws 86, illustrated in FIG. 1, which pass through the electrode guide holder 82 to mate with threaded apertures formed into the foot 34. The bullet electrode guide 36, whose outer surface mates with the interior surface of the electrode guide holder 82, drops into and is retained within the electrode guide holder 82. Upon insertion of the tubular electrode 46 through the bullet electrode guide 36, an aperture formed through the bullet electrode guide 36 receives and provides a bearing surface for the tubular electrode 46.

Referring now to FIG. 3, the first hose 56 receives the first flow of machining fluid at a pressure of 55 to 60 kg/cm² from a triplex plunger or other type of high-pressure pump 92. To supply machining fluid to the high-pressure pump 92, the drilling apparatus 20 includes a reservoir 94 which has a separate clean machining fluid tank 94a and a spent machining fluid tank 94b. The high-pressure pump 92 draws machining fluid from the clean machining fluid tank 94a via a clean machining fluid line 96 and a check valve 98. In addition to supplying machining fluid to the rotary union 52 of the electrode feed mechanism 42 via the first hose 56, the high-pressure pump 92 also supplies machining fluid to a pressure relief valve 102. The pressure relief valve 102 releases machining fluid from the first hose 56 to limit the maximum pressure of machining fluid supplied to the electrode feed mechanism 42. Machining fluid released from the first hose 56 by the pressure relief valve 102 returns to the clean machining fluid tank 94a via a three-way valve 104 and a clean machining fluid return line 106.

Upon juxtaposing a first end 112 of the tubular electrode 46 with the workpiece 38 to establish an electroerosion machining gap 114, machining fluid supplied to the rotary union 52 by the high-pressure pump 92 passes sequentially through the hollow spindle of the electrode feed mechanism 42 (not depicted in any figures), through the electrode chuck 44, through the hollow tubular electrode 46, and into the electroerosion machining gap 114. After the machining fluid flows out of the electroerosion machining gap 114, it then drains onto the worktable 32 from which it flows back to the spent machining fluid tank 94b of the reservoir 94 via a spent machining fluid return line 116.

To recycle spent machining fluid, the drilling apparatus 20 includes a filter supply pump 122 which draws spent machining fluid from the spent machining fluid tank 94b via a spent machining fluid supply line 124. Machining fluid from the filter supply pump 122 passes through a machining fluid filter 126. A fraction of the machining fluid leaving the machining fluid filter 126 flows through a filtered machining fluid return line 132 to the clean machining fluid tank 94a of the reservoir 94. The remainder of the machining fluid leaving the machining fluid filter 126 flows through the filtered machining fluid return line 132 to a needle valve 134. Machining fluid which passes through the needle valve 134 then flows through an ion exchange column 136 to return to the clean machining fluid tank 94a of the reservoir 94 via a deionized machining fluid return line 138. An operator of the drilling apparatus 20 maintains the resistivity of the machining fluid in the clean machining fluid tank 94a at some pre-established value by adjusting the needle valve 134 to control the rate at which machining fluid flows through the ion exchange column 136.

The drilling apparatus 20 also includes a machining fluid chiller 142 which draws machining fluid from the clean machining fluid tank 94a via a chiller inlet line 144 and returns chilled machining fluid to the clean machining fluid tank 94a via a chiller outlet line 146. A temperature sensitive control 148 monitors the temperature of the machining fluid in the clean machining fluid tank 94a and activates the machining fluid chiller 142 if the temperature of the machining fluid exceeds a pre-established value.

A ground lead 152 from a power supply 154, which is included in the drilling apparatus 20, connects to the worktable 32. A machining power lead 156 connects the power supply 154 to the electrode feed mechanism 42 thereby permitting the power supply 154 to apply a series of electrical machining pulses between the tubular electrode 46 and the workpiece 38. The electrical machining pulses from the power supply 154 cause electrical discharges to pass through the machining fluid filled electroerosion machining gap 114 between the first end 112 of the tubular electrode 46 and the workpiece 38. The electrical discharges passing between the first end 112 and the workpiece 38 electroerosively remove material from the workpiece 38. As material is electroerosively removed from the workpiece 38, the electrode feed mechanism 42 relatively displaces the tubular electrode 46 with respect to the workpiece 38 to maintain the spacing of the electroerosion machining gap 114 between the first end 112 of the electrode feed mechanism 42 and the workpiece 38, and to advance the first end 112 of the electrode feed mechanism 42 into the workpiece 38 as the workpiece 38 erodes.

While the drilling apparatus 20 as described thus far may be used for electroerosively drilling holes through the workpiece 38 in accordance with the disclosure of the Inoue '292 Patent, the drilling apparatus 20 in accordance with the present invention also includes a flushing nozzle assembly 162 that is most clearly illustrated in FIG. 2. The flushing nozzle assembly 162 includes an annularly-shaped flushing nozzle mount 164 and a cup-shaped flushing nozzle 166.

The flushing nozzle mount 164 is pierced by a cylindrically-shaped aperture 172 that is shaped to fit snugly around and seal with the outer surface of the electrode guide holder 82 projecting downward beneath the foot 34. An outer cylindrical-shaped surface 174 of the flushing nozzle mount 164 has threads 176 formed thereon which mate with and engage threads 178 formed on an inner surface of the flushing nozzle 166. Similar to the electrode guide holder 82, three screws, not illustrated in any of the figures, pass through the flushing nozzle mount 164 and mate with threaded apertures formed in the foot 34 to secure the flushing nozzle mount 164 to the bottom of the foot 34.

The cup-shaped flushing nozzle 166 includes a cylindrically-shaped side wall 182 which is pierced by an inlet port 184. The inlet port 184 connects to a second hose 186 which supplies the flushing nozzle assembly 162 with a second flow of machining fluid indicated by an arrow 188 in FIG. 1. One end of the side wall 182 is closed by a frustro conically-shaped bottom wall 192 that is pierced by an outlet port 194. As illustrated in FIG. 4, threading the flushing nozzle 166 onto the flushing nozzle mount 164 establishes a machining fluid chamber 196 within the flushing nozzle assembly 162. The machining fluid chamber 196 encircles a segment of the tubular electrode 46 that is enclosed within the bullet electrode guide 36. When the flushing nozzle assembly 162 is in use, the second flow of machining fluid enters the machining fluid chamber 196 through the inlet port 184 and flows out of the machining fluid chamber 196 through an annularly-shaped flushing gap 198 which surrounds a segment of the tubular electrode 46 that is enclosed within the bullet electrode guide 36. The flushing gap 198 directs this second flow of machining fluid about the tubular electrode 46 enclosed within the bullet electrode guide 36 toward the electroerosion machining gap 114.

Referring now to FIG. 5a, depicted there is the lower end of the bullet electrode guide 36 juxtaposed with the workpiece 38 as the first end 112 of the tubular electrode 46 electroerosively forms a hole 202 into the workpiece 38. As illustrated in FIG. 5a, the first flow of machining fluid, indicated by the arrow 54, passes down an inner bore 204 of the tubular electrode 46 until it flows out of the first end 112 into the electroerosion machining gap 114. Upon entering the electroerosion machining gap 114, the first flow of machining fluid immediately becomes contaminated with swarf 206 which the machining fluid then carries upward out of the hole 202 along a cylindrically-shaped outer surface 208 of the tubular electrode 46. Upon leaving the hole 202, the machining fluid carrying the swarf 206 flows horizontally outward from the tubular electrode 46 across an upper surface 212 of the workpiece 38.

FIG. 5a also depicts a second flow 214 of machining fluid flowing down a cylindrically-shaped outer surface 216 of the bullet electrode guide 36 toward the electroerosion machining gap 114. While the first end 112 of the tubular electrode 46 forms the hole 202 into but not through the workpiece 38, this second flow 214 of machining fluid merely flows along the outer surface 216 of the bullet electrode guide 36 and the inner bore 204 of the tubular electrode 46 immediately adjacent to the lower end of the bullet electrode guide 36 to mix with the first flow of machining fluid coming from the hole 202.

Referring now to FIG. 5b, as the first end 112 of the tubular electrode 46 pierces through a lower surface 218 of the workpiece 38, the first flow of machining fluid, indicated by the arrow 54, no longer flows upward out of the hole 202 along a cylindrically-shaped outer surface 208 of the tubular electrode 46. Rather, the first flow of machining fluid now passes out of the workpiece 38 through the hole 202 being formed through the lower surface 218. When this occurs, the first flow of machining fluid entrains machining fluid within the hole 202 surrounding the inner bore 204 of the tubular electrode 46 thereby reversing the direction of machining fluid flow within the hole 202. If no second flow 214 of machining fluid were directed toward the electroerosion machining gap 114 from the flushing gap 198, then the space between the inner bore 204 of the tubular electrode 46 and the hole 202 would immediately fill with air entering through the end of the hole 202 formed through the upper surface 212, machining would becomes unstable, and machining speed would slow drastically. However, because the flushing gap 198 of the present invention directs the second flow 214 of machining fluid toward the electroerosion machining gap 114, machining fluid of the second flow 214 is drawn downward into the hole 202 along the inner bore 204 of the tubular electrode 46 into the electroerosion machining gap 114. The presence of the second flow 214 of machining fluid in the electroerosion machining gap 114 maintains the stability of machining and machining speed while the first end 112 of the tubular electrode 46 pierces through the workpiece 38.

To achieve the results described above in connection with FIG. 5b, the outlet port 194 formed through the bottom wall 192 of the flushing nozzle assembly 162 preferably provides a width of 1.0 to 3.0 mm for the flushing gap 198 between the outer surface 216 of the bullet electrode guide 36 and the bottom wall 192 of the flushing nozzle 166. In operating the drilling apparatus 20 for drilling holes using the flushing nozzle assembly 162, an operator of the drilling apparatus 20 adjusts the three-way valve 104, illustrated in FIG. 3, so the flushing gap 198 directs a column of machining fluid as a jet down the outer surface 216 of the bullet electrode guide 36. It is important that the second flow 214 of machining fluid in the column flowing down the outer surface 216 of the bullet electrode guide 36 should be free of air bubbles, and should entrain no air in the machining fluid. While there is no particularly preferred pressure for the second flow machining fluid within the machining fluid chamber 196, the pressure of the machining fluid there will be far less than the pressure of 55 to 60 kg/cm$^2$ of the machining fluid being supplied to the inner bore 204 of the tubular electrode 46. For example, a flushing gap 198 having a width of 1.0 mm the pressure of machining fluid within the machining fluid chamber 196 may be less than 5 kg/cm$^2$.

Successful operation of the drilling apparatus 20 when using the flushing nozzle assembly 162 requires proper adjustment of the flow of machining fluid through the flushing gap 198. The kinetic energy of machining fluid flowing from the flushing gap 198 tends to carry it into the electroerosion machining gap 114 in opposition to the flow of machining fluid through the inner bore 204 which flushes swarf 206 from the electroerosion machining gap 114 before the tubular electrode 46 pierces through the workpiece 38. If the kinetic energy of machining fluid flowing from the flushing gap 198 is too great it can impede the flow of machining fluid through the inner bore 204. Conversely, the flow of machining fluid through the flushing gap 198 must have sufficient kinetic energy to carry the fluid down into the gap while the tubular electrode 46 pierces through the workpiece 38. Because machining conditions vary significantly for different sizes of electrodes, different workpieces, different thicknesses of workpieces, and different electroerosion machining conditions, some experimentation may be required in establishing a suitable flow of machining fluid through the flushing gap 198.

Referring now to FIG. 6, depicted there is an alternative embodiment for the bullet electrode guide 36, identified by the reference character 36', which is preferably used if operation of the drilling apparatus 20 is controlled by a numeric control (not illustrated in any of the figures). The electrode guide 36' includes a frustro conically-shaped upper surface 222 and a frustro conically-shaped lower surface 224 which are joined by a cylindrically-shaped middle surface 226. A ring shaped sapphire insert (not illustrated in any of the figures) is enclosed within the electrode guide 36' immediately adjacent to the bottom of the lower surface 224. Another ring-shaped ceramic insert (not illustrated in any of the figures) is also enclosed within the electrode guide 36' immediately adjacent to the top of the upper surface 222.

Interior surfaces of the sapphire and ceramic inserts provide bearing surfaces which guide the tubular electrode 46.

FIG. 7 depicts the alternative embodiment electrode guide 36' installed within the electrode guide holder 82. As illustrated in FIG. 7, if the flushing nozzle assembly 162 is used with the alternative embodiment electrode guide 36', the outer surface 208 of the tubular electrode 46 and the bottom wall 192 of the flushing nozzle 166 establish the flushing gap 198. Furthermore, it is readily apparent that using the electrode guide 36' any second flow of machining fluid directed out of the flushing gap 198 toward the electroerosion machining gap 114 prevents swarf 206 from contaminating the electrode guide within the electrode guide 36'. To prevent electrical sparking or shorting between the bottom wall 192 of the flushing nozzle 166 and the workpiece 38 if the flushing nozzle assembly 162 is used with the alternative embodiment electrode guide 36', and to prevent electrochemical machining of the workpiece 38 immediately adjacent to the bottom wall 192 of the flushing nozzle 166 if the flushing nozzle assembly 162 is used with the alternative embodiment electrode guide 36', the flushing nozzle 166 is preferably made from a structural insulating polymeric material such as nylon.

Referring now to FIG. 8a, depicted there is an alternative embodiment flushing nozzle assembly. Those elements depicted in FIG. 8a that are common to the illustration of the flushing nozzle assembly 162 depicted in FIG. 4 bear the same reference numeral distinguished by a prime ("'") designation. The flushing nozzle 166' of the flushing nozzle assembly 162' comprises a cylindrically-shaped outer housing 232 which screws onto the flushing nozzle mount 164, and which receives a cylindrically-shaped, moveable inner plunger 234. A coil spring 236, disposed between the outer housing 232 and the inner plunger 234, retracts the inner plunger 234 into the outer housing 232 if a second flow of machining fluid is not supplied to the flushing nozzle assembly 162'. As illustrated in FIG. 8b, if a second flow of machining fluid is supplied to the flushing nozzle assembly 162', then the inner plunger 234 of the flushing nozzle 166' extends outward from the outer housing 232 toward the electroerosion machining gap 114' (not illustrated in FIGS. 8a or 8b).

During machine set-up prior to drilling a hole, retraction of the inner plunger 234 upward into the flushing nozzle assembly 162' facilitates an operator's observation of the relationship between both the lower end of the electrode guide 36' and the first end 112' of the tubular electrode 46' with a workpiece 38' (not illustrated in FIGS. 8a or 8b). After the operator has prepared the drilling apparatus 20' for drilling a hole in the workpiece 38', the application of a second flow of machining fluid to the flushing nozzle assembly 162' disposes the inner plunger 234 and the flushing gap 198' immediately adjacent to the workpiece 38' and to the hole 202' being drilled into the workpiece 38'. Thus, the alternative embodiment flushing nozzle assembly 162' supplies the second flow of machining fluid from the flushing gap 198' more effectively into the hole 202' and the electroerosion machining gap 114' than the flushing nozzle 166 of the flushing nozzle assembly 162.

To minimize as much as possible any adverse effect of the flushing nozzle assembly 162 on the precision with which the drilling apparatus 20 may locate holes in the workpiece 38, the threads 176 and 178 permit the flushing nozzle 166 to rotate freely about the flushing nozzle mount 164 when the compound slide assembly 22 moves laterally with respect to the workpiece 38. The ability of the flushing nozzle 166 to freely rotate about the flushing nozzle mount 164 significantly reduces the effect of any force which the second hose 186, through its resistance to movement of the flushing nozzle assembly 162, might apply to the compound slide assembly 22. Consequently, the ability of the flushing nozzle 166 to freely rotate about the flushing nozzle mount 164 significantly increases the precision of the drilling apparatus 20 as the compound slide assembly 22 moves from drilling location to drilling location on the workpiece 38 in comparison with a drilling apparatus 20 in which the orientation of the second hose 186 were rigidly locked to the compound slide assembly 22.

Although the present invention has been described in terms of the presently preferred embodiment, it is to be understood that such disclosure is purely illustrative and is not to be interpreted as limiting. For example, rather than the compound slide assembly 22 moving the electrode feed mechanism 42 with respect to the worktable 32 and the workpiece 38, the worktable 32 and the workpiece 38 could move with respect to the electrode feed mechanism 42. It is also readily apparent that movement of the tubular electrode 46 with respect to the workpiece 38 when moving from drilling location to drilling location may be effected by electric motors, and that such motors may be operated by a numeric control. As is well known in the art, such a numeric control may lower and raise the electrode feed mechanism 42 together with the electrode chuck 44 which holds the tubular electrode 46, activate and deactivate the electric motor 62 which rotates the electrode chuck 44, turn on and off both the first and second flows of machining fluid, and turn the power supply 154 on and off.

While the present invention increases the productivity of an electroerosion drilling apparatus 20 if the workpiece 38 is not immersed in the water-based machining fluid, nevertheless it is also effective for increasing the productivity of a drilling apparatus 20 in which the workpiece 38 is immersed in the machining fluid. That is, because the present invention flushes swarf 206 from the electroerosion machining gap 114 as the tubular electrode 46 pierces through the workpiece 38 even if the workpiece 38 is immersed in the machining fluid, under such operating conditions the invention reduces the time required for the tubular electrode 46 to break through the lower surface 218 of the workpiece 38. Since the present invention increases the productivity of a drilling apparatus 20 when the workpiece 38 is immersed in the machining fluid, it is effective for increasing the productivity of a drilling apparatus 20 which uses non-water-based machining fluids such as hydrocarbon or silicone oils.

Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a method of electroerosively machining a small and deep hole through a workpiece comprising the steps of establishing and maintaining an electroerosion machining gap by juxtaposing a first end of an elongated and thin tubular electrode with the workpiece, the tubular electrode having a hollow inner bore and an outer surface which are both coaxial with a longitudinal axis of the tubular electrode; supplying a first flow of machining fluid to the inner bore of the tubular electrode and through the inner bore of the tubular electrode into the machining gap established between the first end of the tubular electrode and the workpiece; applying a series of electrical machining pulses between the tubular electrode and the workpiece to cause time-spaced electrical discharges across the machining gap thereby electroerosively removing material from the workpiece; and advancing the tubular electrode along the longitudinal axis relatively into the workpiece, the improvement comprising the steps of:

disposing a flushing nozzle to be spaced apart from the workpiece and arranged about the tubular electrode; and during piercing of the workpiece by the tubular electrode directing from the flushing nozzle a second flow of the machining fluid toward the machining gap along the outer surface of and coaxially with the longitudinal axis of the tubular electrode, whereby machining speed is not drastically reduced as the tubular electrode pierces through the workpiece.

2. The method of claim 1 wherein the machining fluid is a water-based machining fluid.

3. The method of claim 1 wherein a segment of the tubular electrode is surrounded by a flushing nozzle thereby establishing a machining fluid chamber which encircles the segment of the tubular electrode, the flushing nozzle including an outlet port that is directed toward the machining gap and which is formed to establish an annularly shaped coaxial flush gap around the outer surface of the tubular electrode, the second flow of machining fluid being supplied under pressure to the machining fluid chamber and flowing out of the machining fluid chamber through the coaxial flush gap.

4. The method of claim 1 further comprising the step of rotating the tubular electrode about the longitudinal axis while the tubular electrode concurrently advances along the longitudinal axis into the workpiece.

5. An improved drilling apparatus for electroerosively machining a small and deep hole through a workpiece, the drilling apparatus comprising a worktable for receiving the workpiece; a chuck and electrode guide for receiving and securing an elongated and thin tubular electrode, the tubular electrode having a first end which is juxtaposable with the workpiece to establish an electroerosion machining gap therebetween, the tubular electrode also having a hollow inner bore and an outer surface which are both coaxial with a longitudinal axis of the tubular electrode; a fluid supply and pump for supplying a first flow of machining fluid to the inner bore of the tubular electrode and through the inner bore of the tubular electrode into the machining gap established between the first end of the tubular electrode and the workpiece; a power supply for applying a series of electrical machining pulses between the tubular electrode and the workpiece to cause time-spaced electrical discharges across the machining gap thereby electroerosively removing material from the workpiece; and an electrode feed mechanism for relatively displacing the tubular electrode with respect to the workpiece to maintain the machining gap between the first end of the tubular electrode and the workpiece, and for advancing the first end of the tubular electrode into the workpiece; wherein the improvement comprises:

a flushing nozzle spaced apart from the workpiece arranged about the tubular electrode for directing a second flow of the machining fluid along the outer surface of and coaxially with the longitudinal axis of the tubular electrode toward the machining gap; and a secondary machining fluid control for supplying the second flow of the machining fluid to the flushing nozzle during piercing of the workpiece by the tubular electrode, whereby machining speed is not drastically reduced as the tubular electrode pierces through the workpiece.

6. The drilling apparatus of claim 5 wherein said flushing nozzle includes an outer housing which is fixed to said drilling apparatus and an inner plunger which retracts into the outer housing when the second flow of machining fluid is not supplied to said flushing nozzle, the inner plunger extending outward from the outer housing toward the machining gap when the second flow of machining fluid is supplied to said flushing nozzle, the inner plunger directing the second flow of machining fluid toward the machining gap.

7. The drilling apparatus of claim 5 wherein the machining fluid is a water-based machining fluid.

8. The drilling apparatus of claim 5 wherein said flushing nozzle is a coaxial flushing nozzle that surrounds a segment of the tubular electrode and establishes a machining fluid chamber which encircles the segment of the tubular electrode, said coaxial flushing nozzle including an outlet port that is directed toward the machining gap and which is formed to establish an annularly shaped coaxial flush gap around the outer surface of the tubular electrode, the second flow of machining fluid being supplied under pressure to the machining fluid chamber and flowing out of the machining fluid chamber through the coaxial flush gap.

9. The drilling apparatus of claim 8 wherein the annularly shaped coaxial flush gap has a width between 1.0 and 3.0 mm.

10. The drilling apparatus of claim 5 wherein said electrode feed mechanism also rotates the tubular electrode about the longitudinal axis while the tubular electrode concurrently advances along the longitudinal axis into the workpiece.

11. The drilling apparatus of claim 5 wherein a hose supplying the second flow of the machining fluid to said flushing nozzle may rotate about said electrode guide as said electrode guide moves laterally with respect to the workpiece.

12. A drilling apparatus for electroerosively machining a small and deep hole through a workpiece, said drilling apparatus comprising:

a worktable for receiving a workpiece;

a chuck and electrode guide for receiving and securing an elongated and thin tubular electrode, the tubular electrode having a first end which is juxtaposable with the workpiece to establish an electroerosion machining gap therebetween, the tubular electrode also having a hollow inner bore and an outer surface which are both coaxial with a longitudinal axis of the tubular electrode;

a fluid supply and pump for supplying a first flow of machining fluid to the inner bore of the tubular electrode and through the inner bore of the tubular electrode into the machining gap established between the first end of the tubular electrode and the workpiece;

a power supply for applying a series of electrical machining pulses between the tubular electrode and the workpiece to cause time-spaced electrical discharges across the machining gap thereby electroerosively removing material from the workpiece;

an electrode feed mechanism for relatively displacing the tubular electrode with respect to the workpiece to maintain the machining gap between the first end of the tubular electrode and the workpiece, and for advancing the first end of the tubular electrode into the workpiece;

a flushing nozzle spaced apart from the workpiece arranged about the tubular electrode for directing a second flow of the machining fluid along the outer surface of and coaxially with the longitudinal axis of the tubular electrode toward the machining gap; and a secondary machining fluid control for supplying the second flow of the machining fluid to the flushing nozzle during piercing of the workpiece by the tubular electrode, whereby machining speed is not drastically reduced as the tubular electrode pierces through the workpiece.

13. The drilling apparatus of claim 12 wherein said flushing nozzle includes an outer housing which is fixed to said drilling apparatus and an inner plunger which retracts into the outer housing when the second flow of machining fluid is not supplied to said flushing nozzle, the inner plunger extending outward from the outer housing toward the machining gap when the second flow of machining fluid is supplied to said flushing nozzle, the inner plunger directing the second flow of machining fluid toward the machining gap.

14. The drilling apparatus of claim 12 wherein the machining fluid is a water-based machining fluid.

15. The drilling apparatus of claim 12 wherein said flushing nozzle is a coaxial flushing nozzle that surrounds a segment of the tubular electrode and establishes a machining fluid chamber which encircles the segment of the tubular electrode, said coaxial flushing nozzle including an outlet port that is directed toward the machining gap and which is formed to establish an annularly shaped coaxial flush gap around the outer surface of the tubular electrode, the second flow of machining fluid being supplied under pressure to the machining fluid chamber and flowing out of the machining fluid chamber through the coaxial flush gap.

16. The drilling apparatus of claim 15 wherein the annularly shaped coaxial flush gap has a width between 1.0 and 3.0 mm.

17. The drilling apparatus of claim 12 wherein said electrode feed mechanism also rotates the tubular electrode about the longitudinal axis while the tubular electrode concurrently advances along the longitudinal axis into the workpiece.

18. The drilling apparatus of claim 12 wherein a hose supplying the second flow of the machining fluid to said flushing nozzle may rotate about said electrode guide as said electrode guide moves laterally with respect to the workpiece.

* * * * *